US006963853B1

United States Patent
Smith

(12) United States Patent
(10) Patent No.: US 6,963,853 B1
(45) Date of Patent: Nov. 8, 2005

(54) METHOD AND APPARATUS FOR CALCULATING A RETURN ON INVESTMENT FOR WEATHER-RELATED RISK MANAGEMENT

(75) Inventor: Michael Smith, Wichita, KS (US)

(73) Assignee: User-Centric Enterprises, Inc., Wichita, KS (US)

(*) Notice: Subject to any disclaimer, the term of this patent is extended or adjusted under 35 U.S.C. 154(b) by 987 days.

(21) Appl. No.: 09/635,255

(22) Filed: Aug. 9, 2000

(51) Int. Cl.[7] ............................................. G06F 17/60
(52) U.S. Cl. ................................ 705/36; 705/1; 705/4; 705/35; 700/90; 702/3
(58) Field of Search ............................ 705/35, 36, 4; 700/90; 702/3

(56) References Cited

U.S. PATENT DOCUMENTS

| | | | | |
|---|---|---|---|---|
| 4,766,539 A | * | 8/1988 | Fox ................................ | 705/4 |
| 5,491,629 A | * | 2/1996 | Fox et al. ....................... | 702/3 |
| 5,796,932 A | * | 8/1998 | Fox et al. ................... | 707/104.1 |
| 5,832,456 A | * | 11/1998 | Fox et al. ...................... | 705/10 |

FOREIGN PATENT DOCUMENTS

WO    WO 03/017041 A2 *  8/2002

OTHER PUBLICATIONS

IBM Technical Disclosure Bullitin NN950183, Jan. 1995.*

* cited by examiner

Primary Examiner—James P. Trammell
Assistant Examiner—John M Winter
(74) Attorney, Agent, or Firm—Banner & Witcoff, Ltd.

(57) ABSTRACT

A computer-implemented method and system evaluates and displays a return on investment for using weather-related risk-management services. The system includes user interfaces, databases containing information about the accuracy of different forms of weather-related risk-management services and the types and frequency of weather events in different geographical areas, and return on investment functions. The system accepts information about a user's costs of responding to weather warnings and events, retrieves information from its databases and applies the appropriate function to determine a return on investment. The result is then displayed to the user. The method determines the costs of weather-related risks faced by a user under two different risk-management services and compares them, determining a return on investment for the use of one service over the other.

41 Claims, 7 Drawing Sheets

601 Critical Success Index (CSI) = Threats / Total_Events + False_Threats
602 Inaccuracy Index (I) = 1-CSI
603 T = Threats/Unit_Time
604 D = Duration of a Warning
605 Ratio of Time Spent Under Warning = T x D FOR MANUFACTURING:
606    C = Cost_of_Shutting_Down / Unit_Time
607    Total Cost of Weather Precaution = T x D x C
608    Total Cost Of Unnecessary Weather Precaution = T x D x C x I FOR RAILROAD TRANSPORTATION:
609    C = Cost_of_Stopping_a_Train / Unit_Time
610    N = Number_of_Trains_Affected / Threat
611    Total Cost of Weather Precaution = T x D x C x N
612    Total Cost of Unnecessary Weather Precaution = T x D x C x N x I FOR ELECTRIC UTILITIES:
613    C = Cost of Mobilizing for a Weather warning
614    Total Cost of Weather Precaution = T x C
615    Total Cost of Unnecessary Weather Precaution = T x C x I RETURN ON INVESTMENT FOR SWITCHING FROM A TO B:
616    $ROI_A$ = Total Cost Of Unnecessary Weather Precaution$_B$ - Total Cost of Unnecessary Weather Precaution$_A$

FIG. 6

METHOD AND APPARATUS FOR CALCULATING A RETURN ON INVESTMENT FOR WEATHER-RELATED RISK MANAGEMENT

FIELD OF THE INVENTION

The present invention relates generally to the management of risk posed by weather to business and industry, and more particularly to a method of calculating a return on investment for the use of weather-related risk-management services.

BACKGROUND OF THE INVENTION

Companies incur risks in many forms, and they must bear these risks as an inherent cost of doing business. Companies frequently purchase insurance to mitigate losses due to risks such as property damage or legal liability. Merely because the risks are inherent, however, does not mean that they are uncontrollable. Businesses frequently employ risk management principles to minimize risk exposure. Risk management is the practice of identifying, measuring, and redistributing or reallocating risk in order to make risk less costly.

Certain weather-related events present one type of business risk. Risk arises when future events or outcomes are uncertain, and the weather is frequently uncertain and difficult to predict. The weather can have significant effects on business. Storms, lightening, hail, high winds, icy conditions, flooding, and other severe weather can force a business to shut down until normal weather conditions return. Severe weather can interrupt supply lines, shipping, and communications. It can prevent employees from coming to or returning from their places of employment; it can prevent customers from coming to a place of business for conducting transactions. Severe weather can have effects on power utilization levels and energy demands. It can necessitate the complete evacuation of large geographical areas. It can damage physical structures, property, and material assets.

Severe weather can cause expensive damage and destruction if it arrives without warning sufficient for a business to take appropriate precautions. Various governmental and commercial organizations provide general weather prediction services in an attempt to minimize the number of unwarned weather events, thus allowing businesses time to prepare for the strike of severe weather.

Inaccurate or overly general weather prediction services, however, can impose costs of their own. The mere warning of severe weather can cause businesses to take weather precautions, such as shutting down, retaining employees past their normal work hours, rerouting supplies or shipments, working on a skeleton crew, or other measures designed to mitigate or avoid the damage caused by severe weather. The decision to shut down an assembly line in the face of a tornado warning can cost thousands of dollars for each minute of factory inactivity. A utility's decision to mobilize response forces to react to anticipated power outages can be equally expensive. If severe weather does not strike, these costs of precaution are wasted.

The National Weather Service, a division of the National Oceanic and Atmospheric Administration, provides weather forecasts and severe weather warnings for the United States. These forecasts and warning systems, however, are not designed to meet the specific risk management needs of business and industry. For example, severe weather warnings are typically issued for much wider geographic areas and for longer durations than is appropriate for business purposes. Tornado, flash flood, and thunderstorm warnings, for example, are issued by county, even though only a small part of a particular county may be in danger. This results in the issuance of general warnings that are unlikely to correspond to actual severe weather for some locations, and can cause businesses to take unnecessary weather precautions. A weather forecasting and severe weather warning service that is tailored to meet the risk management needs of each business can reduce these unnecessary and wasteful costs.

Weather-related risk-management services typically cost money in the form of weather consulting fees, monitoring costs, and the like. For a business to know whether such services are worthwhile, it is necessary for them to compare the cost of one form of weather-related risk management with the costs of alternate forms of risk management. There is a need, therefore, for a method of calculating a return on investment for the use of weather-related risk-management services.

SUMMARY OF THE INVENTION

In one aspect of the present invention, a return on investment is calculated using information received about a company's costs of weather-related risk and by comparing the costs of weather-related risk using alternate forms of weather-related risk management. The return on investment can be calculated using an Internet-based computer program that allows companies to evaluate whether it would be cost-efficient to invest in more accurate weather risk-management services.

In another aspect of the invention, a return on investment is calculated by comparing the cost of hurricane precautions taken as a result of using one form of weather-related risk management with the cost of unnecessary hurricane precautions taken as a result of using an alternative form of risk management.

In yet another aspect of the invention, a system receives information from a user about costs of weather-related risk and compares the costs of weather-related risk using alternate forms of weather-related risk management.

In yet another aspect of the invention, a system generates return-on-investment information for an electric utility by comparing potential losses and gains to the cost of a more accurate weather prediction service.

BRIEF DESCRIPTION OF THE DRAWINGS

FIG. 6 shows formulas used to calculate return on investment according to one variation of the present invention.

DETAILED DESCRIPTION

Figure 1:
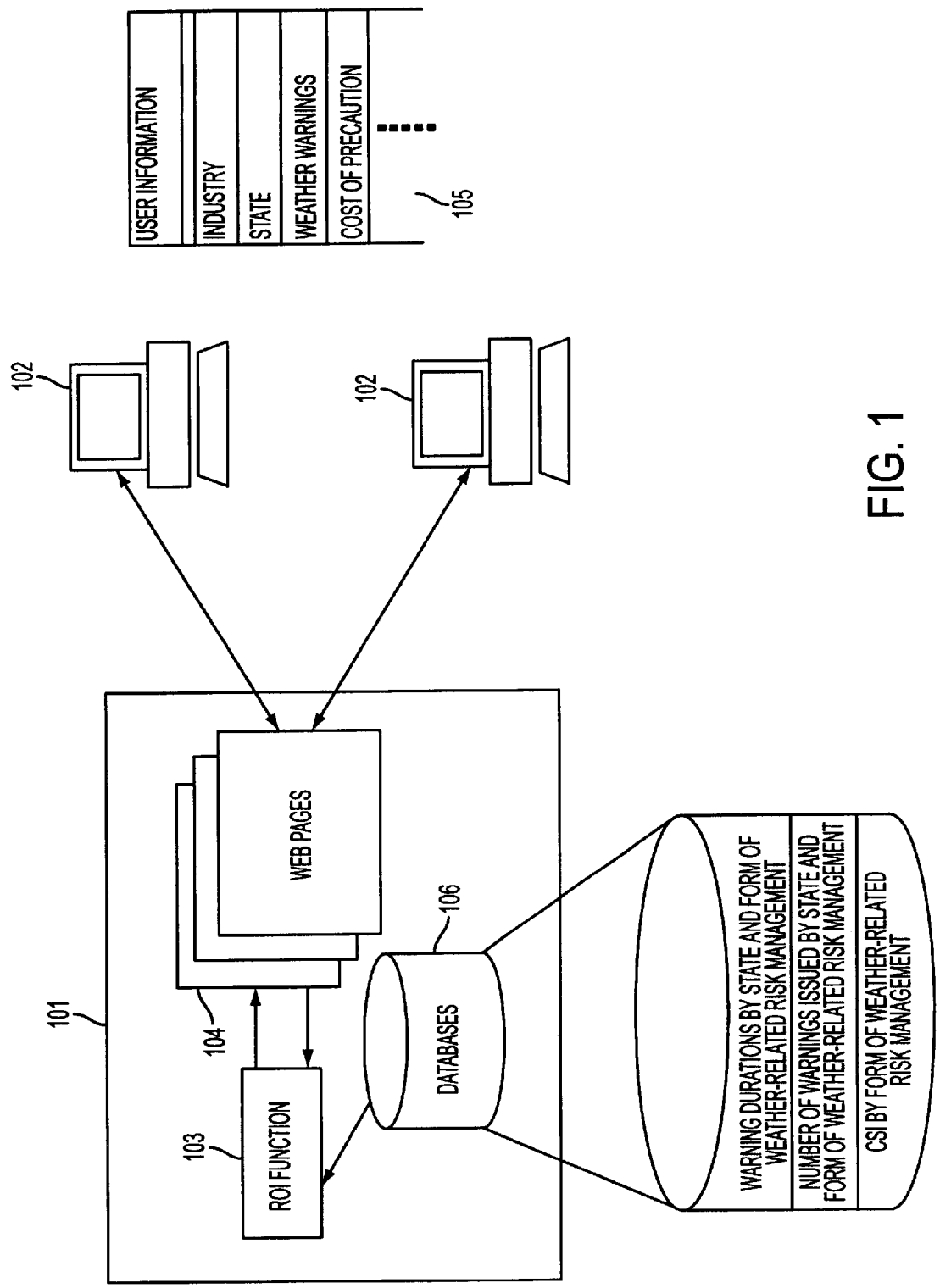
FIG. 1 is a schematic block diagram of a system that operates according to one variation of the present invention.

Weather-related risk-management services are a form of risk management involving the prediction of weather events and/or issuance of warnings that are specific to a particular company, location, or geographic area. Forms of weather-related risk management include any manner of managing the risks to business or industry posed by weather. Such services can be provided externally, such as by an outside forecasting or consulting group, or internally, by members of or a division of a business. One form of weather-related risk management is exemplified by a business that takes no weather precautions whatsoever, and carries on operations as though no severe weather will ever strike. In other words, no severe weather warning is ever issued or acted upon in this form of weather-related risk management.

Another form of weather-related risk management is exemplified by a business that always shuts down operations in a particular county whenever the National Weather Service issues a severe weather warning for that county. Yet another form of weather-related risk management is exemplified by a business that employs an outside weather-related risk-management consulting service to provide weather forecasts and severe weather warnings for the specific locations of that business's operations, or to provide recommendations for specific types of weather precautions to take in the face of different weather forecasts. Recommended precautions for a manufacturing plant, for example, might be to shut down in the face of a tornado warning or to send out shipments early to avoid a projected ice storm along shipping routes. Recommended precautions for a utility might be to increase staffing and power output in response to a projected heat wave.

For return on investment calculation purposes, any warning of severe weather or recommendation to take specific precautionary measures in response to a particular forecast will be referred to as a "weather warning."

Different forms of weather-related risk management deal with three basic types of weather-related risk. The first type of risk is the risk of weather warnings that do not correspond to a subsequent weather event, or "false warnings." The cost of a false warning is the cost of taking unnecessary weather precautions in response to the false warning. The second type of risk is the risk of weather events that are not preceded by a weather warning warning, or "unwarned weather events." The cost of an unwarned weather event is the cost of weather damage (or expense) in excess of the cost of weather precaution. For example, if an unwarned ice storm causes $2 million, worth of damage that could have been cut in half by a $200,000 precaution, the cost of the unwarned event is $800,000. The third type of risk is the risk of suboptimal precaution. A business that takes a precaution in response to a weather warning that is more expensive or less effective than an available alternative incurs the cost of this type of risk. The cost of suboptimal precaution is the difference between the value of the optimal precaution and the value of the suboptimal precaution taken. For example, suppose a weather event will cause $2 million of weather damage if no precaution is taken. If a business takes a $500,000 precaution that saves $1 million in weather damage, but an alternative $600,000 precaution is available that would have saved $1.5 million in weather damage, the cost of suboptimal precaution is $400,000.

FIG. 1 shows an illustrative embodiment of a computer-implemented system 101 whereby one or more users 102 can access a return-on-investment calculation function 103 over a network, such as the Internet. A web browser is used to interact with a series of web pages 104, through which the user provides information 105 such as the user's industry, location, and information relating to the user's cost of taking weather precautions. The system on which the accessed web pages 104 reside then invokes the return on investment function 103. This function utilizes the user-provided information and information retrieved from one or more databases 106 to calculate a dollar value reflecting how much the user would benefit from the use of weather-related risk-management services. This return-on-investment value is then provided to the user's web browser for display.

The database 106 accessed by the return on investment function 103 contains information such as the critical success index for different forecasting services and information about the number of weather warnings issued by those services per county per year for different states. One of those forecasting services, as in the described embodiment, could be the National Weather Service. Another of those services could be the weather-related risk management service for which the user seeks a return on investment calculation. Information on other forecasting services could be included. While the described database contains the number of warnings per county per year for different states, different measures of warning frequency could be used and still comply with the spirit and principles of the present invention. For example, the database could contain the number of warnings per year for different counties or warnings per year for different states, or could use a different unit of time measurement, such as per month or per decade.

Figure 2:
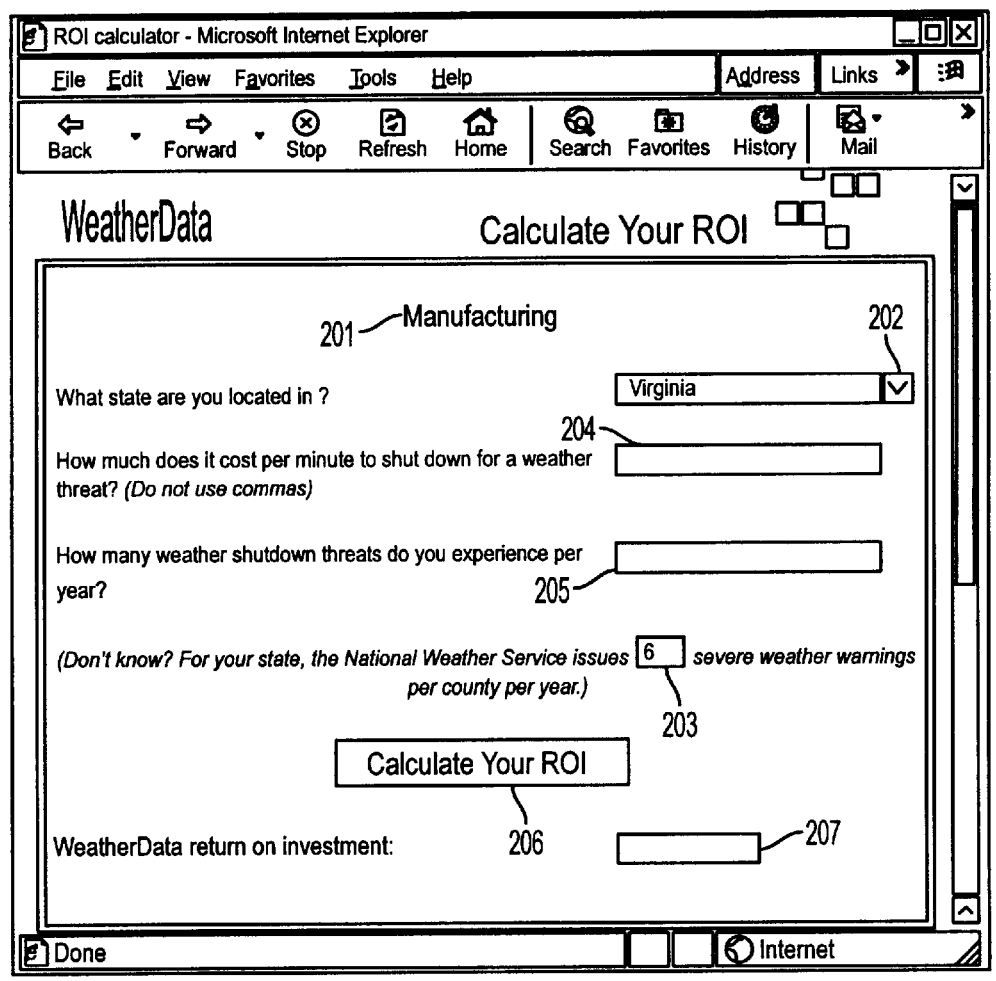
FIG. 2 shows a computer screen including fields for user input regarding cost of risk information.

FIG. 2 shows illustrative web pages through which the system receives relevant information from the user. Some of the information fields may vary according to the chosen industry 201. The user chooses a state 202. The system automatically displays in box 203 the average number of warnings issued by the National Weather Service per county per year for the region corresponding to the user' state. The user then provides information about the company's cost of weather precaution in box 204, in this case the cost of shutting down a manufacturing facility, and the number of weather warnings experienced per year in box 205 (if the database-provided value is not used). Clicking on the "Calculate" button 206 invokes the return on investment function, and the result of this function is displayed for the user in text box 207. The term "company" should be understood to broadly refer to any potential company or user of the system, including corporations, partnerships, and nonprofit organizations.

Figure 3:
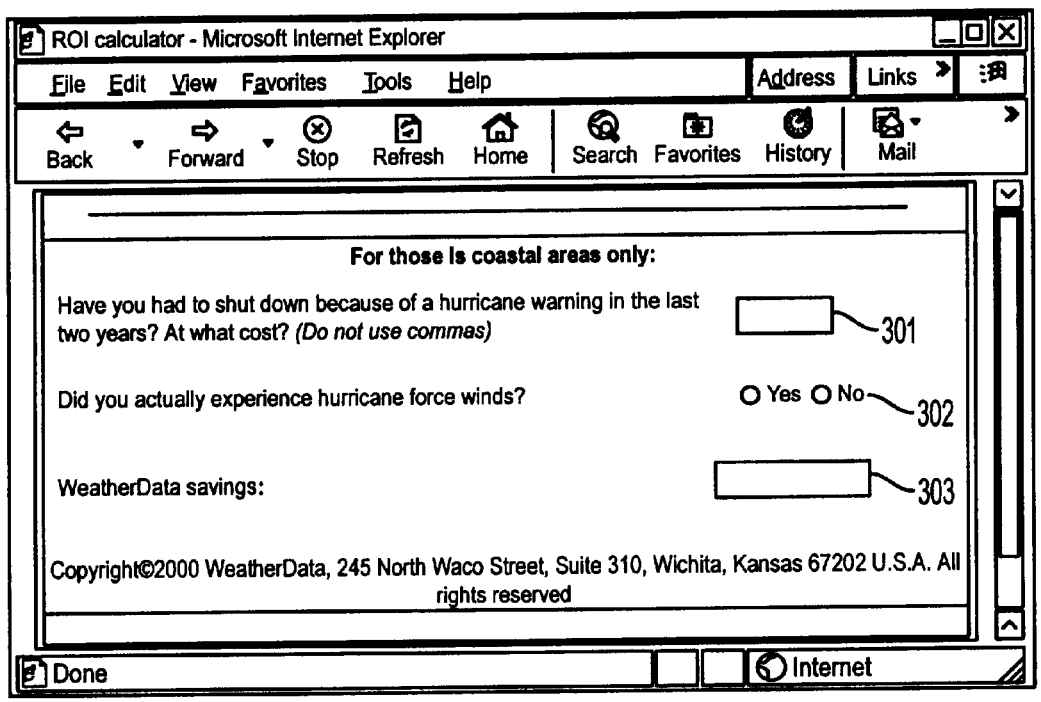
FIG. 3 shows a computer screen including fields for user input regarding cost of hurricane risk information.

FIG. 3 shows illustrative web pages through which the system receives relevant information from the user about a cost of hurricane risk. The user provides the system with the dollar amount spent on hurricane precautions over the past two years in text box 301. The user then tells the system whether hurricane-force winds were experienced in box 302, and the return-on-investment function is invoked. The result of this function is then displayed for the user in text box 303.

Figure 4:
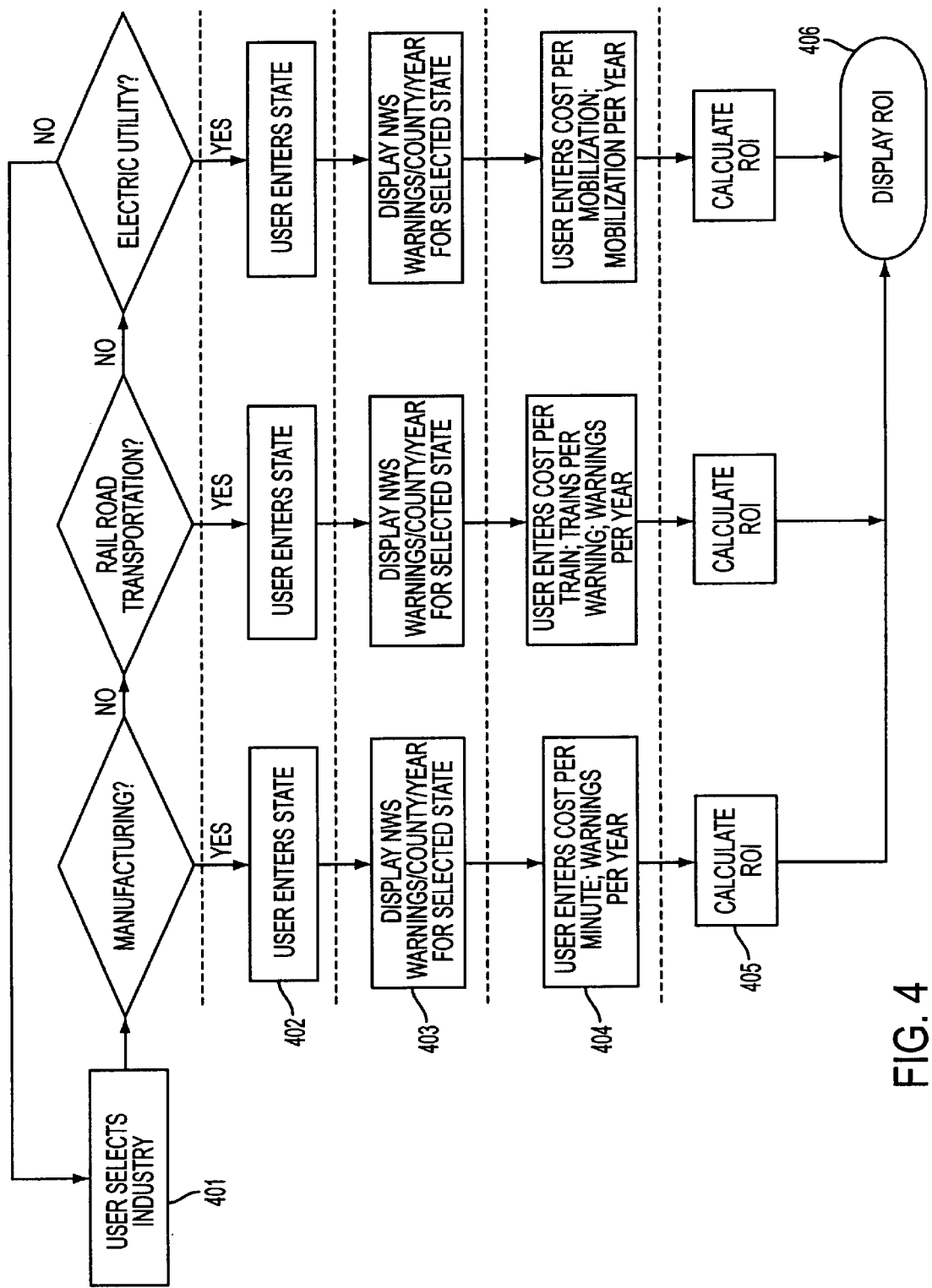
FIG. 4 is a flow chart showing steps of accepting user information according to one variation of the present invention.

FIG. 4 shows a flow chart detailing the process by which the system receives information from the user and calculates the return on investment. As a first step in this illustrative embodiment, the user selects one of a plurality of industry choices (step 401). The user then chooses a state where the user's business is located 402. Based on this information, the system displays the number of warnings per county per year issued by the National Weather Service in the selected state (step 403). The user then enters information related to the cost of weather precautions in the selected industry (step 404). The type of information entered can differ depending on the industry (see FIG. 4). The system then uses this information to calculate a return on investment for the use of weather-related risk-management services (step 405). Finally, this return-on-investment value is displayed to the user (step 406).

While the embodiment illustrated in FIG. 4 shows a choice of only three industries, the principles of the present invention can be applied to other industries, such as aviation, insurance, media, or education, to name a non-exclusive list of alternatives. Additionally, some of the steps shown in FIG. 4 could be performed in a different sequence. For example, the system could accept information about a user's state first and the user's industry second. The particular ordering of the steps is not an essential element of the present invention.

Figure 5:
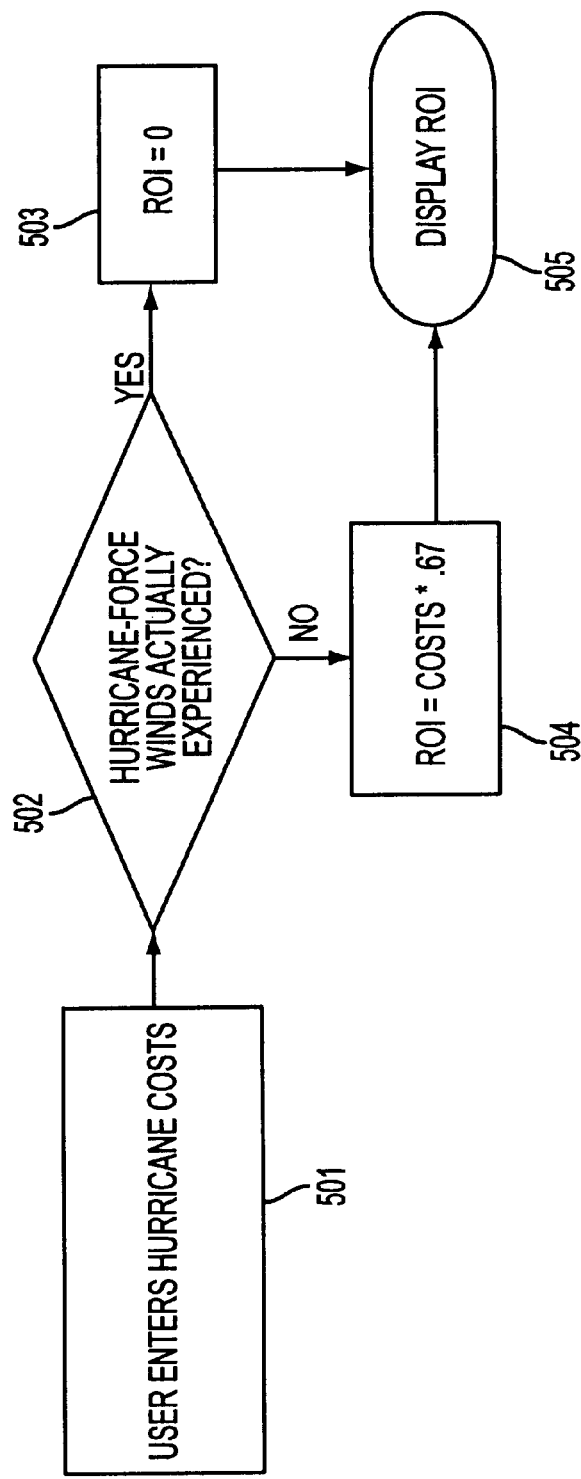
FIG. 5 is a flow chart showing how the system determines a return on investment for hurricane warnings according to one variation of the present invention.

FIG. 5 shows a flow chart detailing the process by which the system receives information about the user's hurricane precaution costs. The user provides information about how much was spent on hurricane precautions over a time period (step 501). If hurricane-force winds were actually experienced (step 502), then the precautions taken were necessary and weather-related risk-management services would not have prevented those costs. The return on investment in that case is zero (step 504). If hurricane-force winds were not actually experienced (step 502), the costs of precaution were unnecessary. The return on investment in that case is the cost of precaution discounted by the probability that the use of a different form of weather-related risk management would not have resulted in a hurricane warning for the user. In the illustrative embodiment, the chosen form of weather-related risk management issues a hurricane warning for a geographical area that is one-third the size of that for which the National Weather Service issues a hurricane warning. The cost of precaution is therefore discounted by two-thirds to obtain the return on investment (step 504). The particular amount by which the cost of precaution is discounted in the illustrative embodiment, two-thirds, is not essential to the present invention. The discount represents the degree to which weather-related risk-management services are more accurate than the alternate form of risk management used, in this case the NWS. This default discount factor can be applied in other embodiments of the invention. Finally, the calculated return on investment is displayed to the user (step 505).

FIG. 6 shows particular return on investment formulas used in a preferred embodiment. The "critical success index" (CSI) in line 601 is a formula well known in the art. Total_Events represents the total number of reported weather events in a geographical area. False_Threats represents the number of weather warnings issued for a geographical area that were not confirmed by a report.

The CSI is a rating of a warning-issuing system's accuracy. The more weather events for which a warning is issued, and the fewer warnings issued for which no weather event actually occurs, the higher the CSI rating of that system. The inaccuracy index (line 602), then, is a measure of a warning-issuing system's inaccuracy. A high CSI corresponds to a low inaccuracy index, while a low CSI corresponds to a high inaccuracy index.

Threats are measured per unit of time, such as over the course of a year (line 603). This could be the actual number of warnings issued in a particular year, or an average number of warnings issued over a number of years. The number could also be measured in another unit of time, such as months or decades. The duration of the warning D (line 604) is also measured in units of time, such as minutes. Again, the unit of time used could be altered—seconds or hours, for example. The ratio of time spent under warning (line 605) will be expressed in the form of minutes per hour, or whichever particular units of time are used in measuring T and D.

For manufacturing, cost C (line 606) is measured as the cost of shutting down a manufacturing facility per unit of time. For simplicity, this cost is measured per minute, as was Duration. The Total Cost of Weather Precaution (line 607), then, is the ratio of time spent under warning multiplied by the cost of shutting down, that is, the cost of responding to a warning. This represents the cost of weather precaution for a manufacturing business. Some of this cost will be necessary, but some will be needless. Multiplying this cost by the inaccuracy index for the warning-issuing system yields the Total Cost of Unnecessary Weather Precaution 608. For railroad transportation, cost C (line 609) is measured as the cost of stopping a train per unit of time, in this case per minute. The number of trains stopped N (line 610) represents the average number of trains stopped per weather warning. Multiplying C by N yields an average cost per minute of weather precaution. Multiplying this cost by the ratio of time spent under weather warning yields a total cost of weather precaution (line 611). Multiplying this number by the inaccuracy rating of the warning-issuing system yields the cost of unnecessary weather precaution (line 612).

For electric utilities, cost C (line 613) may comprise the cost of mobilizing a response force to deal with a potential weather event. Multiplying this cost by the number of warnings yields the total cost of weather precaution (line 614). Multiplying this figure by the inaccuracy rating of the warning-issuing system yields the cost of unnecessary precaution (line 615).

To calculate a return on investment, a cost of unnecessary precaution is calculated for a particular industry using two different warning-issuing systems. Each of these systems will have its own number of issued warnings, duration of warning, CSI and inaccuracy index. Subtracting one of these costs of unnecessary precaution from the other will yield the return on investment for switching to the first weather-related risk management service (line 616).

Power production utilities face another cost of weather-related risk from inaccurate temperature forecasts. Electricity consumption is typically a function of different factors, one of which is temperature. In one form of weather-related risk management, an electric utility receives a temperature forecast for a time period and targets a level power production for that time period. When that time period passes, the actual temperature may have been lower or higher that the forecast temperature. Some minor variations from the forecast temperature will not have an appreciable impact on power consumption, but temperature variations outside a certain range will have an appreciable impact. If power production was set too low, the utility may need to purchase power to cover the deficiency—typically at a price higher than the utility's cost of production. If power production was set too high, then the utility may have excess power that may be sold to recover some costs of production. Providing an electric utility company with the ability to more accurately (or more precisely) predict temperatures can reduce the costs associated with deficient or excess power production.

Figure 7:
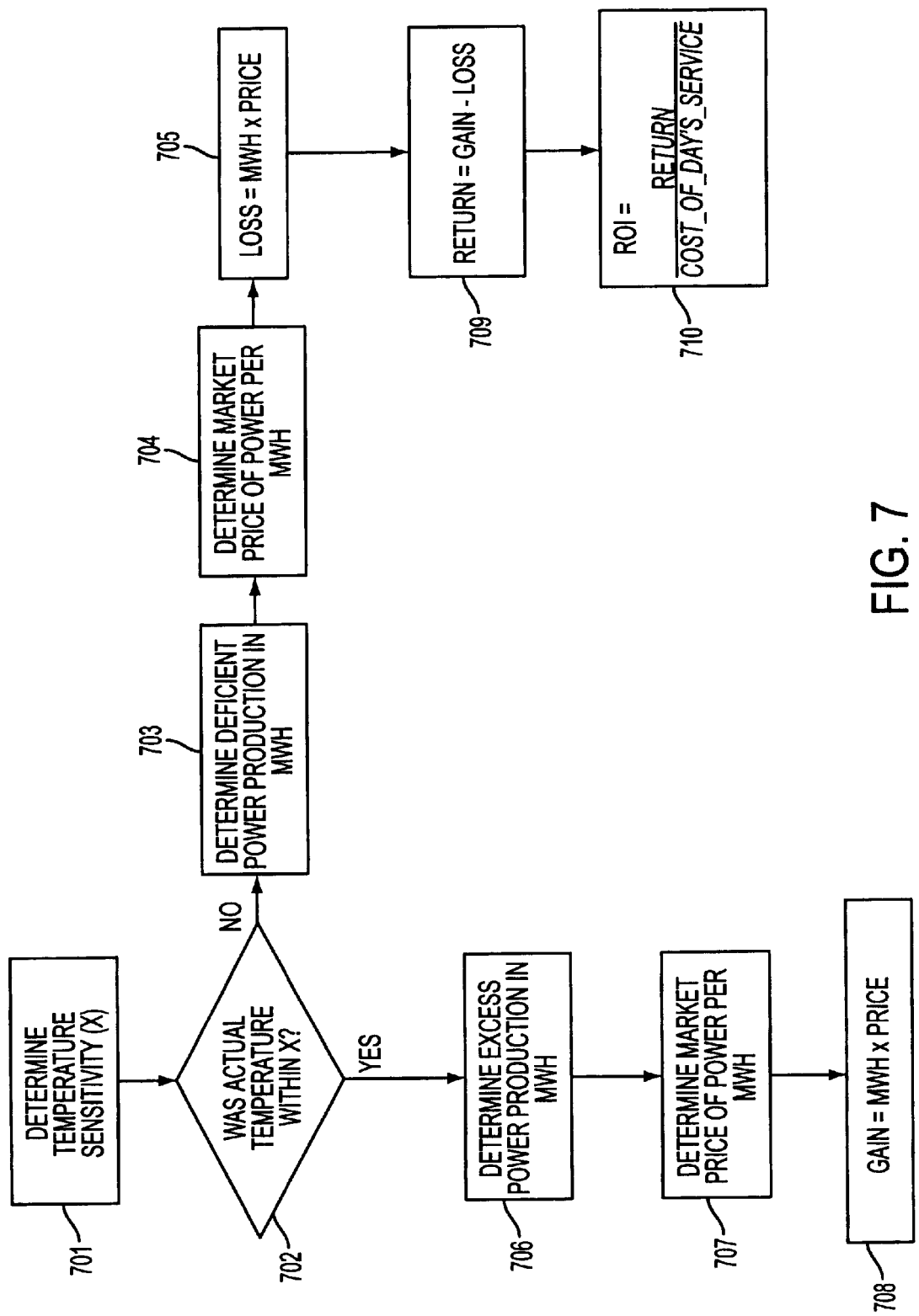
FIG. 7 is a flow chart showing how to calculate a return on investment for using weather prediction services for electric utilities according to one variation of the invention.

FIG. 7 shows a method of calculating a return on investing in such a service for an electric utility. A utility may not have a linear production function; some forecast temperatures may result in identical power production. An electric utility may be able to tolerate a temperature deviation from a perfect forecast by a certain amount without affecting its power production. For example, if the high temperature forecast for a particular day is 90 degrees, the utility may not alter its generating capacity if the actual high temperature instead reaches 91 degrees. On the other hand, the utility may be required to increase its generating capabilities if the actual temperature reaches 93 degrees, and this action may impose certain costs, such as purchasing additional electricity on the open market at a loss. Consequently, a utility may specify a sensitivity range X as a range of temperatures (e.g., 88 degrees to 92 degrees) within which it cannot differentiate between a perfect forecast and a small error.

Turning to FIG. 7, in step 701 the electric utility determines a sensitivity value X which, as described above, can constitute a range of temperatures within which the utility cannot distinguish from a perfect forecast. This parameter can be based on various objective and subjective criteria that are specific to each utility. The parameter can be entered into a computer using the web-enabled principles described above with regard to other embodiments of the invention.

In step 702, a test is made to determine whether the actual temperature was within this range. If the actual temperature fell outside this range, the utility may not have produced enough electricity, resulting in a deficiency that can be determined (step 703) in megawatt-hours (MWH). To cover the deficiency, the utility may need to purchase power at market price. The market price of power can be determined in step 704 by consulting a published pricing source or database such as the Wall Street Journal, which publishes daily prices of electricity in megawatt-hour units. The utility's loss, then, is the amount of deficiency multiplied by the price per unit power (step 705).

If in step 702 the actual temperature falls within the range X, then any inaccuracies in forecasting would not have resulted in deficient power production. There may, however, be excess production of power in this situation. In step 706, a determination is made as to whether there was excess capacity that could potentially be sold for a gain. The utility's gain in this scenario is the amount of excess power produced multiplied by the market price per unit power (step 708). If there was no excess capacity, then the gain is zero.

In step 709, the return is calculated based on the difference between any gains and any losses. In step 710, the return on investment is the return divided by the cost of a day's service for more accurate weather forecasting services.

What has been described above is merely illustrative of the application of the principles of the present invention. Other arrangements and methods can be implemented by those skilled in the art without departing from the spirit and scope of the present invention. Any of the methods of the invention can be implemented in software that can be stored on computer disks or other computer-readable media for execution in a host or target computer. No claim should be interpreted in means-plus-function format. Numbered steps in method claims should not be interpreted to require a particular ordering of the steps.

What is claimed is:

1. A computer-implemented method of calculating a return on investment for a form of weather-related risk management comprising the steps of:
   (1) receiving in a computer information about a company's cost of responding to weather warnings;
   (2) determining a cost of weather-related risk us ing a first form of weather-related risk management;
   (3) determining a cost of weather-related risk using a second form of weather-related risk management; and
   (4) generating a displayable output reflecting the difference between the cost of weather-related risk using the second form of risk management and the cost of weather-related risk using the first form of weather-related risk management.

2. The method of claim 1 wherein step (1) further comprises the steps of:
   (a) receiving information about the company's industry;
   (b) receiving information about the company's geographic location;
   (c) receiving information about the company's cost of responding to a weather warning; and
   (d) receiving information about the number of times the company responds to weather warnings per year.

3. The method of claim 2 further comprising the step of providing a list of industries from which to choose.

4. The method of claim 2 further comprising the step of providing a list of states from which to choose.

5. The method of claim 2 further comprising the step of displaying the average number of National Weather Service weather warnings issued per county per year in the company's region.

6. The method of claim 1 wherein step (2) further comprises determining a cost of unnecessary weather precautions taken using the first form of weather-related risk management.

7. The method of claim 6 wherein step (2) further comprises the steps of:
   (a) determining a ratio of time spent under weather warning using the first form of weather-related risk management;
   (b) determining a cost per unit time of taking weather precautions;
   (c) calculating an inaccuracy index of weather warnings issued under the first form of weather-related risk management; and
   (d) multiplying the ratio of time spent under weather warning, the cost per unit time of taking weather precautions, and the inaccuracy index, resulting in the cost of unnecessary weather precautions taken using the first form of weather-related risk management.

8. The method of claim 7 wherein step (c) comprises the steps of:
   (i) determining a number of weather warnings issued per unit time;
   (ii) determining a number of weather events per unit time;
   (iii) determining a number of false warnings issued per unit time; and
   (iv) applying a formula: 1−[warnings issued per unit time/(weather events per unit time+false warnings issued per unit time)].

9. The method of claim 7 wherein step (b) comprises determining a cost per unit time of shutting down a manufacturing facility.

10. The method of claim 7 wherein step (b) comprises the steps of:
    (i) determining a number of railroad trains affected by weather warnings;
    (ii) determining a cost per unit time of stopping a railroad train; and
    (iii) multiplying the number of railroad trains affected by weather warnings by the cost per unit time of stopping a railroad train.

11. The method of claim 6 wherein step (2) further comprises the steps of
    (a) determining a number of weather warnings issued per unit of time under the first form of weather-related risk management;
    (b) determining a cost of mobilizing an electric utility facility to respond to a weather warning;
    (c) calculating an inaccuracy index of weather warnings issued under the first form of weather-related risk management; and (d) multiplying the number of warnings per unit of time, the cost of mobilizing an electric facility, and the inaccuracy index, resulting in the total cost of unnecessary weather precautions taken using the first form of weather-related risk management.

12. The method of claim 11 wherein step (c) comprises the steps of:
   (i) determining a number of warnings issued per unit time;
   (ii) determining a number of weather events per unit time;
   (iii) determining a number of false warnings issued per unit time; and
   (iv) applying a formula: 1−[warnings issued per unit time/(weather events per unit time+false warnings issued per unit time)].

13. The method of claim 1 wherein step (3) further comprises determining a cost of unnecessary weather precautions taken using the second form of weather-related risk management.

14. The method of claim 13 wherein step (3) further comprises the steps of:
   (a) determining a ratio of time spent under weather warning using the second form of weather-related risk management;
   (b) determining a cost per unit time of taking weather precautions;
   (c) determining an inaccuracy index of weather warnings issued under the second form of weather-related risk management; and
   (d) multiplying the ratio of time spent under weather warning, the cost per unit time of taking weather precautions, and the inaccuracy index, resulting in the cost of unnecessary weather precautions taken using the second form of weather-related risk management.

15. The method of claim 14 wherein step (c) comprises the steps of:
   (a) determining a number of warnings issued per unit time;
   (b) determining a number of weather events per unit time;
   (c) determining a number of false warnings issued per unit time; and
   (d) applying a formula: 1−[warnings issued per unit time/(weather events per unit time+false warnings issued per unit time)].

16. The method of claim 15 wherein the number of warnings issued per unit time is the number of warnings issued for a geographical area by the National Weather Service per unit time.

17. The method of claim 14 wherein step (b) comprises determining a cost per unit time of shutting down a manufacturing facility.

18. The method of claim 14 wherein step (b) comprises the steps of:
   (i) determining a number of railroad trains affected by weather warnings;
   (ii) determining a cost per unit time of stopping a railroad train; and
   (iii) multiplying the number of railroad trains affected by weather warnings by the cost per unit time of stopping a railroad train.

19. The method of claim 13 wherein step (3) further comprises the steps of
   (a) determining a number of weather warnings issued per unit of time under the second form of weather-related risk management;
   (b) determining a cost of mobilizing an electric utility facility to respond to a weather warning;
   (c) calculating an inaccuracy index of weather warnings issued under the second form of weather-related risk management; and
   (d) multiplying the number of weather warnings per unit time, the cost of mobilizing an electric facility, and the inaccuracy index, resulting in the cost of unnecessary weather precautions taken using the second form of weather-related risk management.

20. The method of claim 19 wherein step (c) comprises the steps of:
   (i) determining a number of warnings issued per unit time;
   (ii) determining a number of weather events per unit time;
   (iii) determining a number of false warnings issued per unit time; and
   (iv) applying a formula: 1−[warnings issued per unit time/(weather events per unit time+false warnings issued per unit time)].

21. The method of claim 20 wherein the number of warnings issued per unit time is the number of warnings issued for a geographical area by the National Weather Service per unit time.

22. The method of claim 1 further comprising the step of (5) receiving information about a company's cost of weather damage.

23. The method of claim 22 wherein step (2) comprises determining a cost of unwarned weather events using the first form of weather-related risk management.

24. The method of claim 22 wherein step (2) comprises determining a cost of suboptimal weather precaution taken using the first form of weather-related risk.

25. The method of claim 22 wherein step (3) comprises determining a cost of unwarned weather events using the second form of weather-related risk management.

26. The method of claim 22 wherein step (3) comprises determining a cost of suboptimal weather precaution taken using the second form of weather-related risk.

27. A computer-implemented method of calculating a return on investment for forms of weather-related risk management comprising the steps of:
   (1) receiving in a computer information about a company's cost of responding to hurricane warnings;
   (2) determining a cost of unnecessary hurricane precautions; and
   (3) displaying the cost of unnecessary hurricane precautions.

28. The method of claim 27 wherein step (l) further comprises the steps of:
   (a) receiving information about a number of hurricane warnings to which the company responded in a given time period;
   (b) receiving information about a cost of responding to hurricane warnings incurred during the given time period; and
   (c) receiving information about a number of times the company experienced hurricane-force winds during the given time period.

29. The method of claim 27 wherein step (2) further comprises the steps of:
   (a) determining a cost of precautions taken in response to hurricane warnings in a given time period using a first form of weather-related risk management;
   (b) if the company did not actually experience hurricane-force winds during the given time period, then discounting the cost of precautions taken in response to hurricane warnings by the probability that the company would have experienced hurricane warnings using a second form of weather-related risk management, resulting in a cost of unnecessary hurricane precautions taken using the first form of weather-related risk management; and (c) if the company did actually experience hurricane-force winds during the given time period, then discounting the cost of precautions taken in response to hurricane warnings using the first form of weather-related risk management to zero, resulting in the cost of unnecessary hurricane precautions using the first form of weather-related risk management.

30. A computer-implemented system for the calculation of a return on investment for forms of weather-related risk management, comprising a computer having:

a database containing information about a plurality of forms of weather-related risk management;

a computer-implemented interface function that receives information about a cost of weather-related risk; and a computer-implemented return on investment function that operates on information retrieved from the database and information received by the interface function and generates a displayable return-on-investment result, where the database contains information about a plurality of critical success indices of a plurality of forms of weather-related risk management.

31. A computer-implemented system for the calculation of a return on investment for forms of weather-related risk management, comprising a computer having:

a database containing information about a plurality of forms of weather-related risk management;

a computer-implemented interface function that receives information about a cost of weather-related risk; and a computer-implemented return on investment function that operates on information retrieved from the database and information received by the interface function and generates a displayable return-on-investment result, where the interface function receives information about a user's industry, location, and number of weather warnings responded to per unit time.

32. The system of claim 31 where the database contains information about a number of weather warnings issued by a plurality of forms of weather-related risk management.

33. The system of claim 31 where the database contains information about a duration of weather warnings issued by a plurality of forms of weather-related risk management.

34. The system of claim 31 where the National Weather Service is one of the forms of the plurality of forms of weather-related risk management about which the database contains information.

35. The system of claim 31 where the interface function receives information about a cost per unit time of shutting down a manufacturing facility.

36. The system of claim 31, where the interface function receives information about a number of railroad trains shut down per weather warning and cost of shutting down a railroad train per unit time.

37. The system of claim 31, where the interface function receives information about an electric utility's cost of mobilizing a weather warning response unit.

38. The system of claim 31 where the interface function receives information about a user's cost of hurricane precaution.

39. A method of generating a displayable return-on-investment value for use in evaluating a weather-related risk-management service for an electric utility, comprising the steps of:

(1) receiving in a computer a range of predicted temperatures over which no change in electrical production will occur;

(2) comparing an actual high temperature occurring on a given day with the temperature range, if the actual high temperature falls outside the range received in step (1), determining a loss based on a deficiency in electrical production;

(3) determining a return on investment for using the weather-related risk-management service based on the loss determined in step (2); and (4) displaying the result determined in step (3).

40. The method of claim 39, wherein step (2) comprises the steps of:

(a) if the actual high temperature falls within the range received in step (1), determining whether excess power production capacity is available;

(b) determining a gain based on the excess power production capacity; and (c) using the gain in step (b) to determine the return on investment in step (3).

41. The method of claim 40, wherein step (2) comprises the step of using a publicly available cost value for megawatt-hours to determine the loss and gain.

* * * * *